United States Patent
Berry et al.

(10) Patent No.: US 7,904,888 B2
(45) Date of Patent: Mar. 8, 2011

(54) METHOD, SYSTEM AND COMPUTER PROGRAM PRODUCT FOR TRACING SOFTWARE METHODS

(75) Inventors: Robert Francis Berry, Southampton (GB); Matthew Alexander Webster, Hook (GB); Nicholas Harry Huismans, Woking (GB); Jonathan James Davies, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1996 days.

(21) Appl. No.: 10/793,461

(22) Filed: Mar. 4, 2004

(65) Prior Publication Data

US 2004/0250242 A1 Dec. 9, 2004

(30) Foreign Application Priority Data

Jun. 5, 2003 (GB) .................................. 0312886.5

(51) Int. Cl.
*G06F 9/44* (2006.01)
*G06F 11/00* (2006.01)

(52) U.S. Cl. .......................................... 717/128; 714/45
(58) Field of Classification Search .................... 717/128
See application file for complete search history.

(56) References Cited

U.S. PATENT DOCUMENTS

| | | | | |
|---|---|---|---|---|
| 5,465,258 A * | 11/1995 | Adams | .......................... | 717/128 |
| 6,002,872 A * | 12/1999 | Alexander et al. | ............. | 717/127 |
| 6,118,447 A * | 9/2000 | Harel | ............................ | 717/131 |
| 6,473,895 B1 | 10/2002 | Lopes et al. | | |
| 7,089,400 B1 * | 8/2006 | Pickett et al. | ................. | 711/217 |
| 7,152,226 B2 * | 12/2006 | Pangburn | ....................... | 717/125 |
| 7,165,190 B1 * | 1/2007 | Srivastava et al. | ............... | 714/38 |
| 2002/0010882 A1 * | 1/2002 | Yamashita | ....................... | 714/45 |
| 2002/0144236 A1 * | 10/2002 | Beer et al. | ....................... | 717/124 |
| 2003/0056200 A1 * | 3/2003 | Li et al. | ........................... | 717/128 |
| 2003/0123540 A1 * | 7/2003 | Zhong et al. | ............... | 375/240.07 |
| 2004/0017850 A1 * | 1/2004 | Kim et al. | ................. | 375/240.01 |
| 2004/0205474 A1 * | 10/2004 | Eskin et al. | .................... | 715/500 |

OTHER PUBLICATIONS

Reiss, S. P. and Renieris, M. 2000. Generating Java trace data. In Proceedings of the ACM 2000 Conference on Java Grande (San Francisco, California, United States, Jun. 3-4, 2000). JAVA '00. ACM Press, New York, NY, 71-77.*

Jerding, D. F., Stasko, J. T., and Ball, T. 1997. Visualizing interactions in program executions. In Proceedings of the 19th international Conference on Software Engineering (Boston, Massachusetts, United States, May 17-23, 1997). ICSE '97. ACM Press, New York, NY, 360-370.*

"JaViz: A client/server Java profiling tool", IBM Systems Journal vol. 39 No. 1, 2000, p. 99, 100, & 102, Kazi et al.

* cited by examiner

*Primary Examiner* — James Rutten
(74) *Attorney, Agent, or Firm* — Yee & Associates, P.C.; David A. Mims, Jr.

(57) ABSTRACT

A method of obtaining trace data with respect to a running software program includes accessing a method in a call stack, the call stack including a sequentially ordered list of methods called during the running of the software program. If the accessed method in the call stack falls between a minimum trace offset and a maximum trace offset where the minimum trace offset and the maximum trace offset define a trace window, obtaining trace data for the method and outputting it to an output stream which is then collected into a trace data storage. If the trace data in the trace data storage meets predetermined adaptation rules then changing the position in the call stack of at least one of the minimum trace offset and the maximum trace offset.

15 Claims, 3 Drawing Sheets

US 7,904,888 B2

METHOD, SYSTEM AND COMPUTER PROGRAM PRODUCT FOR TRACING SOFTWARE METHODS

FIELD OF THE INVENTION

This invention relates to the generation of trace data for software methods in a call stack of a software application in execution on a computer system. In particular it relates to an adaptive mechanism for generating trace data which adapts in response to trace data already generated.

BACKGROUND OF THE INVENTION

In software development a software application is often designed and built in a modular fashion. The application is divided into multiple modules known as software methods, each providing a particular function of the application. A method includes a block of program code comprising a series of instructions which can be executed in a computer system. A method is executed by loading the program code into a memory of the computer system and executing the program code in a processor of the computer system.

A first method in execution usually calls a second method, this involves suspending the execution of the first method and commencing the execution of the second method. The second method subsequently executes in the processor of the computer system. Once the execution of the second method has completed it is terminated and the first method resumes execution. The termination of the execution of the second method and the resumption of the execution of the first method is known as a method return. During the execution of the software application methods may invoke many other methods in this way, and an invoked method may invoke further methods and so on.

A data structure known as a call stack is used to store all methods in execution in the computer memory at a given point in time. The call stack is an implementation of a stack data structure which stores a series of data elements in a sequential manner as is well known in the art. Elements of a stack are always added and removed to and from the top of the stack. The call stack contains methods in execution in the application. Methods are added to the top of the call stack when they are invoked, and removed from the top of the call stack when they return. The first method invoked for an application is typically placed at the bottom of a new call stack, known as the base of the call stack. The call stack grows and shrinks as methods are added (called) and removed (returned). Each method in the call stack can be referenced by it's position in the call stack as an offset from the base of the stack. As methods are added to the top of the call stack the stack grows and the method at the top of the call stack is said to be "deeper" in the stack. Similarly, methods near the base of the call stack are said to be "shallow" in the stack.

In addition to providing the functionality for the application, methods may also generate data at run-time known as trace data. Trace data may include information such as time stamps, variable contents, details of threads and input and output operations. Once generated, trace data from the execution of an application is typically stored to a data store (such as a hard disk drive). Trace data is subsequently used by software analysts or software analysis tools to, for example, model the application in operation in order to make improvements to the application in execution. The analysis involves an examination of trace data for a specific subset of all the methods in an application, known as the "methods of interest". Ideally this analysis is done at runtime so that changes can be made to the execution of the application in response to findings of the analysis.

Exactly which methods in the application are the methods of interest depends on the purpose of the analysis. For example, analysis directed to improving the performance of an application may focus on those methods which take the most time to execute. The methods of interest are not usually found deep in a call stack, as the deeper methods in a call stack often implement highly detailed logic. Additionally, the methods of interest are not usually found near the base of the call stack, as these methods are often high-level structural methods with little implementation detail. Rather, the methods of interest typically fall somewhere between the shallowest methods in the call stack and the deepest methods in the call stack.

If too many methods are traced an unacceptably large volume of trace data will be produced. The trace data for the methods of interest is mixed with extraneous trace data relating to other methods. A software developer or analysis tool would then be required to identify and separate the trace data for the methods of interest from the extraneous trace data.

One known solution to limit the quantity of trace data generated when tracing an application is to generate trace data only for those methods with an offset from the base of the call stack which does not exceed a predefined maximum trace offset. For example, if the maximum trace offset is four stack positions from the base of the call stack, this known solution limits trace data generation to those methods which are offset by no more than four stack positions from the base of the call stack. While this prevents the generation of extraneous trace data for deep method invocations, trace data will still be generated for shallow methods which do not exceed the maximum trace offset. Therefore, the present state of the art often still produces too much extraneous trace data. This makes analysis of such trace data at runtime impractical.

SUMMARY OF THE INVENTION

According to a first aspect, the present invention provides a method of obtaining trace data with respect to a running software program including accessing a method in a call stack, the call stack including a sequentially ordered list of methods called during the running of the software program. If the accessed method in the call stack falls between a minimum trace offset and a maximum trace offset where the minimum trace offset and the maximum trace offset define a trace window, obtaining trace data for the method and outputting it to an output stream which is then collected into a trace data storage. If the trace data in the trace data storage meets predetermined adaptation rules then changing the position in the call stack of at least one of the minimum trace offset and the maximum trace offset.

According to a second aspect, the invention provides a computer program product for, when run on a computer, carrying out the method of the first aspect described above.

According to a third aspect, the invention provides an apparatus for carrying out the method described above.

Thus with the present invention methods in a call stack are only traced if they fall within the trace window. This provides the advantage that trace data can be generated for a subset of methods in an application regardless of where in the call trace stack the subset of methods falls. Furthermore, the trace window can be changed in response to the trace data store meeting predetermined adaptation rules. This is advantageous because, for example, if the trace data store is filled close to capacity, the trace window can be adapted to trace a smaller subset of methods so accounting for the limited available storage space remaining in the trace data store. Additionally the smaller subset of methods can be a subset containing methods of interest to software analysts.

BRIEF DESCRIPTION OF THE DRAWINGS

Preferred embodiments of the present invention will now be described in detail by way of example only with reference to the following drawings.

DETAILED DESCRIPTION OF THE PREFERRED EMBODIMENT

Figure 1:
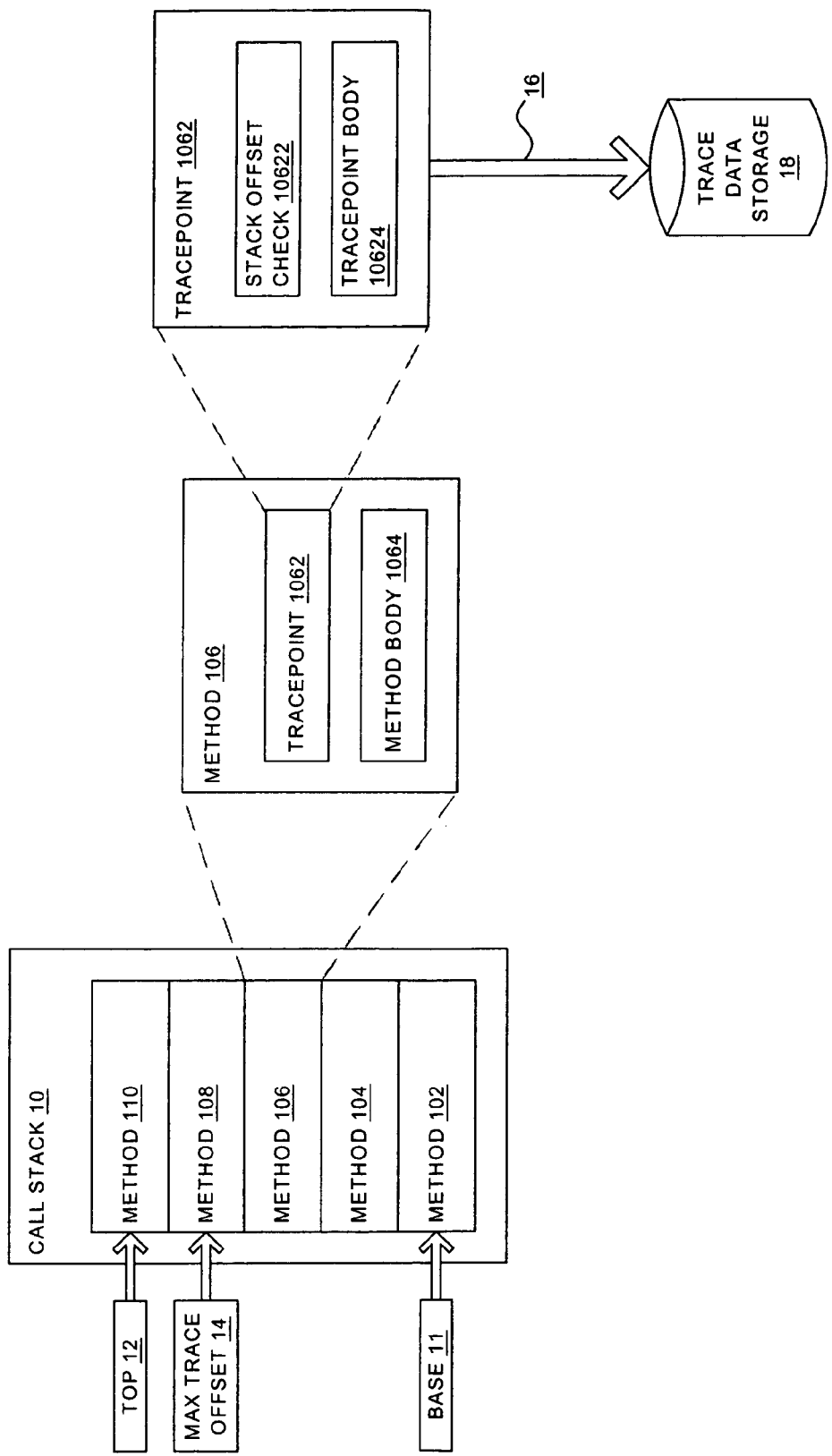
FIG. 1 illustrates an exemplary configuration of an application in execution on a computer system which generates trace data according to the prior art.

FIG. 1 illustrates an exemplary configuration of an application, according to the prior art, in execution which generates trace data on a computer system. The computer system (not illustrated) includes a memory for storing the application in execution and a processor for executing the application. Call stack 10 is a data structure stored in the memory of the computer system and comprises a sequential list of software methods 102 to 110. Methods 102 to 110 collectively constitute the application in execution at a point in time.

Method 102 is the first method called in the application and is positioned at the base of the call stack 10. The base of the call stack is marked by a pointer to the call stack 10 referred to as the base 11. Method 102 invokes method 104 which is positioned immediately above method 102 in the call stack 10. Method 104 subsequently invokes method 106 and so on. Method 110 is the last method invoked. The position of method 110 is marked by a pointer to the call stack 10 known as top 12 as it represents the top of the call stack 10. Thus each method has a position in the call stack 10, known as a stack position, which has a corresponding offset from the base 11. The position of a method in the call stack relative to base 11 is known as a stack offset. Method 104 is offset by one stack position from the base 11. Therefore, method 104 has a stack offset of one. Method 106 is offset by two stack positions from the base 11. Therefore, method 106 has a stack offset of two, and so on.

The application is configured to record trace data for software methods in the call stack 10. A maximum trace offset 14 represents the maximum offset from base 11 at which trace data for a method will be generated. Trace data is not generated for a method with a stack offset greater than the maximum trace offset 14. In the exemplary configuration, the maximum trace offset 14 is three stack positions from the base 11.

An exploded view of method 106 is provided to illustrate a software method configured to generate trace data. Method 106 comprises tracepoint 1062 and method body 1064. Tracepoint 1062 is a collection of software instructions directed at generating trace data for method 106. Method body 1064 is a collection of software instructions which provide functionality for method 106. An exploded view of tracepoint 1062 is provided comprising stack offset check 10622 and tracepoint body 10624. Stack offset check 10622 is a collection of software instructions which determine whether the stack offset of method 106 is greater than the maximum trace offset 14. Tracepoint body 10624 is responsive to stack offset check 10622. If stack offset check 10622 determines that the stack offset of method 106 is greater than the maximum trace offset 14, tracepoint body 10624 does nothing. However, if stack offset check 10622 determines that the stack offset of method 106 is not greater than the maximum trace offset 14, tracepoint body 10624 generates a stream of trace data 16 for method 106. The stream of Trace data 16 includes data of interest to a software analyst or a software analysis tool such as a time stamp and a value of a variable in the method 106. Tracepoint body 10624 sends the stream of trace data 16 to a trace data storage 18 where it is recorded. Trace data storage 18 is a storage device such as a hard disk drive. All of methods 102 to 110 are implemented in the same way as method 106.

The operation of the application of FIG. 1 is outlined below by way of example. The application is executed by first executing method 102. Method 102 subsequently executes method 104 which executes method 106. During the execution of method 106, tracepoint 1062 is executed including stack offset check 10622 and tracepoint body 10624. Stack offset check 10622 determines that the stack offset of method 106 is two stack positions, and that this is not greater than the maximum trace offset 14 which is three stack positions. Responsive to this determination, tracepoint body 10624 generates a stream of trace data 16 for method 106 which is sent to trace data storage 18. Trace data is generated by methods 102, 104 and 108 in the same way as for method 106 because each of these methods has a stack offset which is not greater than the maximum trace offset 14. In contrast, consider method 110 which has a stack offset of four stack positions. Since the stack offset of method 110 is greater than the maximum trace offset 14 of three stack positions, no trace data is generated for method 110.

Figure 2:
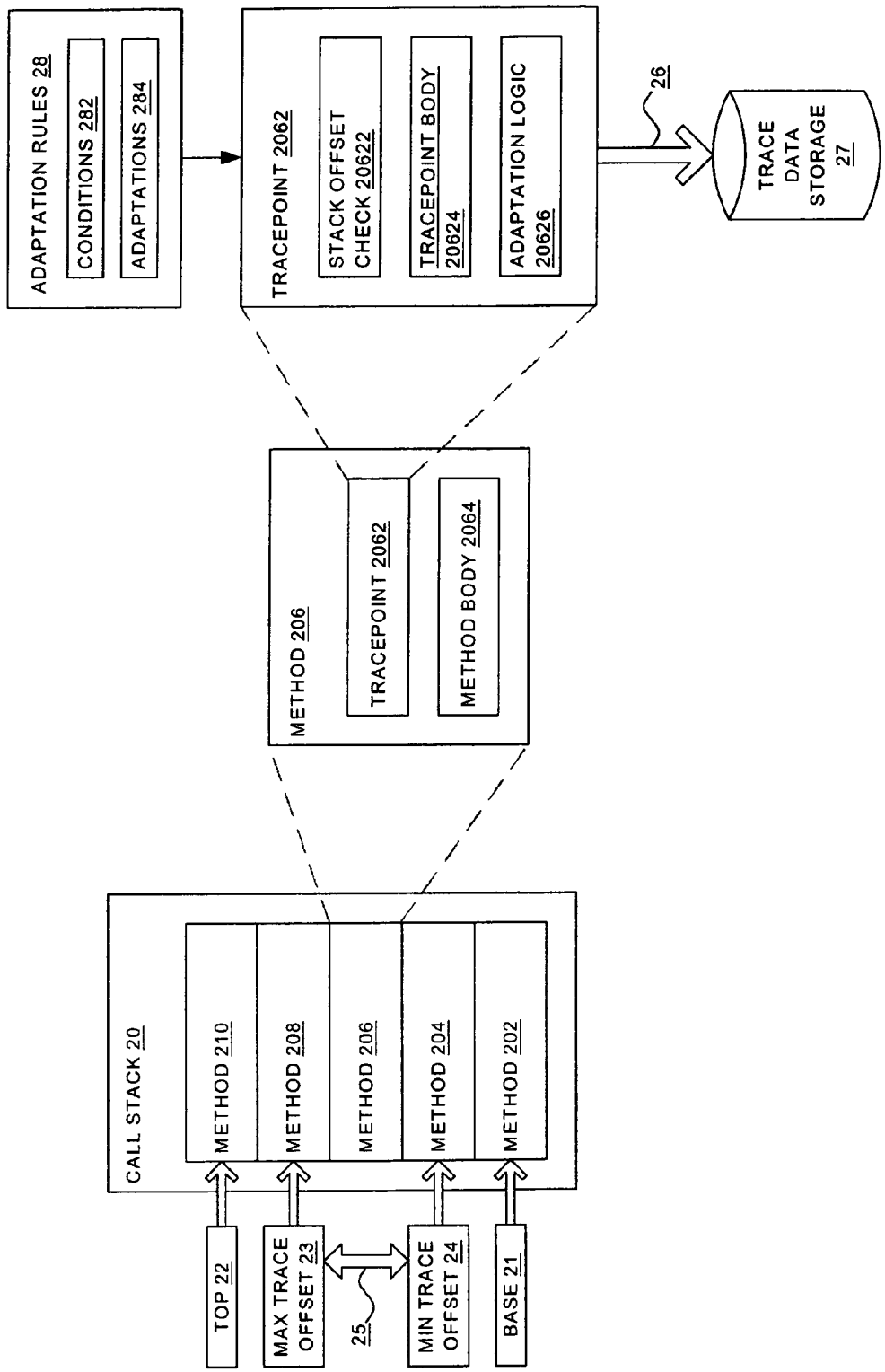
FIG. 2 illustrates an exemplary configuration of an application in execution on a computer system generating trace data according to a preferred embodiment of the present invention.

FIG. 2 illustrates an exemplary configuration of an application in execution generating trace data on a computer system in accordance with a preferred embodiment of the present invention. Many elements of FIG. 2 are identical to those described with respect to FIG. 1 and these will not be repeated here in the description of FIG. 2. Those elements of FIG. 2 which differ from the elements of FIG. 1 are described below.

In addition to the elements described with respect to FIG. 1, a minimum trace offset 24 is defined. In the exemplary configuration, the minimum trace offset 24 is an offset of one stack position from the base 21. Minimum trace offset 24 represents the minimum offset from base 21 at which trace data for a method will be generated. Trace data is not generated for a method with a stack offset lower than the minimum trace offset 24.

The maximum trace offset 23 and the minimum trace offset 24 further define a trace window 25 as a range of stack offsets from the base 21 of call stack 20. In the exemplary configuration, the trace window 25 is the range of offsets from one stack position to three stack positions from base 21. The trace window 25 represents the range of stack offsets from base 21 for which trace data for methods will be generated. Trace data is not generated for those methods in the call stack 20 with an offset which falls outside the trace window 25.

An exploded view of method 206 is provided to illustrate a software method configured to generate trace data. Method 206 comprises tracepoint 2062 and method body 2064. Method body 2064 is identical to the method body 1064 of FIG. 1. Tracepoint 2062 is a collection of software instructions directed at generating trace data for method 206. An exploded view of tracepoint 2062 is provided comprising stack offset check 20622, tracepoint body 20624 and adaptation logic 20626. All of methods 202 to 210 are implemented in the same way as method 206.

Stack offset check 20622 is a collection of software instructions which determine whether the stack offset of method 206 is within the trace window 25. The stack offset of method 206 is within the trace window 25 if it is not greater than the maximum trace offset 23 and not less than the minimum trace offset 24. Tracepoint body 20624 is responsive to stack offset check 20622. If stack offset check 20622 determines that the stack offset of method 206 is not within the trace window 25, tracepoint body 20624 does nothing. However, if stack offset check 20622 determines that the stack offset of method 206 is within the trace window 25, tracepoint body 20624 generates a stream of trace data 26 for method 206. The stream of trace data 26 is sent to a trace data storage 27.

Trace window 25 is adaptable by changing the position of one or both of the maximum trace offset 23 and the minimum trace offset 24. A set of adaptation rules 28 define when and how the trace window 25 will be adapted. Adaptation rules 28 include one or more conditions 282 under which the trace window 25 is adapted. Adaptation rules 28 further include one or more adaptations 284 which define how the trace window 25 is adapted when each of the conditions 282 are satisfied. The adaptation rules 28 are implemented by adaptation logic 20626 of tracepoint 2062. If any of the conditions 282 are satisfied the adaptation logic 20626 adapts trace window 25 in accordance with the adaptations 284. For example, adaptation rules 28 may include a condition "if the storage 27 is full to 90% of it's capacity" and a corresponding adaptation "narrow the trace window 25". Thus if the adaptation logic 20626 determines that the data storage 27 is full to 90% of it's capacity, adaptation logic 20626 narrows the trace window 25. In order to narrow the trace window 25 the minimum trace offset 23 may be incremented, resulting in a narrowing of the range of offsets in trace window 25.

The process of generating trace data for method 206 of FIG. 2 for an exemplary configuration of the adaptation rules 28 is outlined below with reference to the method illustrated in FIG. 3. An example of a configuration of adaptations rules 28 is defined in pseudo-code form in the table below. Each rule includes a condition and a corresponding adaptation.

| Rule | Conditions 282 | Adaptations 284 |
|---|---|---|
| A | If the trace data storage 27 is greater than 90% full | narrow the trace window 25: increment the minimum trace offset 24 |
| B | If the trace data storage 27 is less than 30% full | widen the trace window 25: decrement the minimum trace offset 24 |
| C | If more than 50% of the trace data in the trace data storage 27 is generated by methods with a stack offset lower than two stack positions | Move the trace window 25 up the call stack 20: increment the maximum trace offset 23 increment the minimum trace offset 24 |

Figure 3:
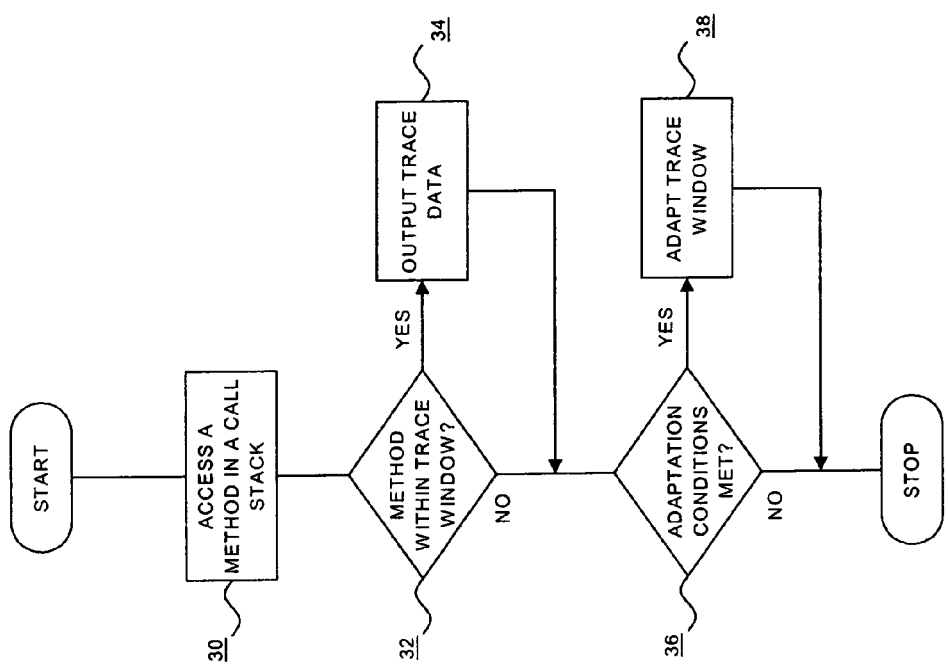
FIG. 3 is a flowchart illustrating the steps of a method to generate trace data for the collection of methods of FIG. 2 in accordance with a preferred embodiment of the present invention.

When method 206 is called, it is accessed in the call stack 20 (see step 30 in FIG. 3). Tracepoint 2062 initially checks if the stack offset of method 206 is within the trace window 25 (see step 32 in FIG. 3). If method 206 is within the trace window 25, tracepoint body 20624 outputs trace data for the method (see step 34 in FIG. 2). Adaptation logic 20626 then determines if the adaptation conditions 282 are met (see step 36 in FIG. 3). If the adaptation conditions 282 are met, the trace window is adapted according to the adaptations 284 (see step 38 in FIG. 3).

Each of the exemplary adaptation rules in the table above will be considered in turn. Considering first rule A for the configuration illustrated in FIG. 2, adaptation logic 20626 initially applies the condition of rule A at step 36: if the trace data storage 27 is more than 90% full then the corresponding adaptation for rule A is applied at step 38, which involves narrowing the trace window 25 so that it includes a reduced range of stack offsets. This is achieved by incrementing the minimum trace offset 24 from an offset of one stack position to an offset of two stack positions in the call stack 20. The resulting trace window 25 ranges from an offset of two stack positions to an offset of three stack positions. This adaptation has the effect of reducing the range of the trace window 25 (i.e. a narrowing of the trace window 25) which results in fewer methods in call stack 20 being traced because fewer methods have stack offsets within the narrower trace window 25. Following this adaptation method 204 will no longer fall within the trace window 25. Alternatively, the trace window 25 can be narrowed by decrementing the maximum trace offset 23, or by both decrementing the maximum trace offset 23 and incrementing the minimum trace offset 24. The consequence of narrowing the trace window 25 is that the quantity of trace data being generated is reduced. This is advantageous when the data store 27 is nearly full to capacity as it allows tracing to continue for a reduced set of methods.

Now considering rule B for the configuration illustrated in FIG. 2, adaptation logic 20626 initially applies the condition for rule B at step 36: if the trace data storage 27 is less than 30% full then the corresponding adaptation of rule B is applied at step 38, which involves widening the trace window 25 so that it includes an increased range of stack offsets. This is achieved by decrementing the minimum trace offset 24 from an offset of one stack position to an offset of zero stack positions in the call stack 20. The resulting trace window 25 ranges from an offset of zero stack positions to an offset of three stack positions. This adaptation has the effect of increasing the range of the trace window 25 (i.e. a widening of the trace window 25) which results in more methods in the call stack 20 being traced because more methods have stack offsets within the wider trace window 25. Following this adaptation method 202 will fall within the trace window 25. Alternatively, the trace window 25 can be widened by incrementing the maximum trace offset 23, or by both incrementing the maximum trace offset 23 and decrementing the minimum trace offset 24. The consequence of widening the trace window 25 is that the quantity of trace data being generated is increased. This is advantageous when the trace window 25 has been previously narrowed and subsequently the amount of storage available in data store 27 has increased. For example, if the condition of rule A is satisfied and the trace window 25 is narrowed, and subsequently the available storage in data store 27 increases to satisfy the condition of rule B, the adaptation of rule B causes the widening of the trace window 25 to reverse the previous narrowing.

Now considering rule C for the configuration illustrated in FIG. 2, adaptation logic 20626 initially applies the condition of rule C at step 36: if more than 50% of the trace data in the trace data storage 27 is generated by methods with a stack offset lower than two stack positions, then the corresponding adaptation for rule C is applied at step 38, which involves moving the trace window 25 up the call stack 20. This is achieved by first incrementing the maximum trace offset 23 from an offset of three stack positions to an offset of four stack positions. Then the minimum trace offset 24 is incremented from an offset of one stack position to an offset of two stack positions. Consequently, the trace window 25 has moved from a range of one to three stack positions to a range of two to four stack positions. The number of offsets in the range of trace window 25 is unaffected by the adaptation of rule C, but the trace window 25 is moved by one stack position deeper into the call stack 20. Following this adaptation method 204 will no longer fall within the trace window 25, and method 210 will fall within the trace window 25. The effect is to increase the generation of trace data for deeper methods in the call stack and to decrease the generation of trace data for shallower methods in the call stack. This is advantageous when a large proportion of the trace data stored in trace data store 27 relates to methods which are near the base of the call stack 20. In order to avoid using a large proportion of the data store 27 for such methods they are excluded from the generation of trace data by moving the trace window 25 to a deeper range in the call stack 20.

Similarly, an adaptation to move the trace window 25 to a shallower range in the call stack could be applied by decrementing both the maximum trace offset 23 and the minimum trace offset 24. This is advantageous when a large proportion of the trace data stored in trace data store 27 relates to methods which are deep in the call stack 20. In order to avoid using a large proportion of the data store 27 for such methods they are excluded from the generation of trace data by moving the trace window 25 to a shallower range in the call stack 20.

In an alternative embodiment, the adaptations 284 of adaptation rules 28 are configured to adapt the trace window 25 in order to concentrate the generation of trace data on particular methods of interest. By way of example, consider the configuration illustrated in FIG. 2, and an exemplary definition of a method of interest as a method which takes the longest time to execute. If the time a method takes to execute is included in the trace data stream 26, it is possible to identify a method which takes the longest time to execute from an analysis of the trace data stream 26. In operation, adaptation logic 20626 implements adaptation rules 28 including conditions 282 and analyses the trace data stream 26 to identify the stack offset of a method which takes the longest time to execute. This method is then determined to be a method of interest. Subsequently, the adaptations 284 adapt the trace window 25 to ensure the stack offset of the method of interest is within the trace window 25. Because trace data is only generated for those methods with a stack offset within the trace window 25, the generation of trace data is concentrated on the methods of interest. The trace window 25 can be continually adapted in this way as trace data for different parts of the call stack 20 is generated. In this way the trace window 25 will be adapted to focus on the methods of interest.

One way the adaptation rules 28 can be implemented is using Aspect Oriented Software Development (AOSD) techniques as described in "Aspect Oriented Programming: Introduction" (Elrad, T. et al., Communications of the ACM, October 2001). AOSD is a method of rewriting code automatically, such as the tracepoint 2062, to add or change functionality, such as the adaptation rules 28. AOSD can be implemented using an aspect oriented programming language such as AspectJ (a trademark of Palo Alto Research Center Incorporated).

The invention claimed is:

1. A method of obtaining trace data with respect to a running software program comprising:

accessing a method in a call stack, said call stack including a sequentially ordered list of methods called during the running of the software program;

if the accessed method in the call stack falls between a minimum trace offset and a maximum trace offset where the minimum trace offset and the maximum trace offset define a trace window, obtaining trace data for said method and outputting the trace data to an output stream;

collecting the trace data into a trace data storage; and if the trace data in the trace data storage meets predetermined adaptation rules then changing the position in the call stack of at least one of the minimum trace offset and the maximum trace offset.

2. The method of claim 1 wherein changing the trace window involves narrowing the trace window by changing a position of at least one of said minimum trace offset and said maximum trace offset.

3. The method of claim 1 wherein changing the trace window involves widening the trace window by changing a position of at least one of said minimum trace offset and said maximum trace offset.

4. The method of claim 1 wherein changing the trace window involves moving the trace window by changing a position of both said minimum trace offset and said maximum trace offset.

5. The method of claim 1 wherein changing the trace window involves changing the trace window to include a particular method which was previously not in the trace window.

6. The method of claim 1 wherein said adaptation rules take into account the amount of data stored in said storage.

7. The method of claim 1 wherein said adaptation rules take into account the amount of data stored in said storage which was generated by methods having an offset lower than a particular value.

8. A computer program product comprising computer program code stored on a computer readable storage medium which, when executed on a data processing system, instructs the data processing system to carry out the method of:

accessing a method in a call stack, said call stack including a sequentially ordered list of methods called during the running of the software program;

if the accessed method in the call stack falls between a minimum trace offset and a maximum trace offset where the minimum trace offset and the maximum trace offset define a trace window, obtaining trace data for said method and outputting the trace data to an output stream;

collecting the trace data into a trace data storage; and if the trace data in the trace data storage meets predetermined adaptation rules then changing the position in the call stack of at least one of the minimum trace offset and the maximum trace offset.

9. The computer program product of claim 8 wherein changing the trace window involves narrowing the trace window by changing a position of at least one of said minimum trace offset and said maximum trace offset.

10. The computer program product of claim 8 wherein changing the trace window involves widening the trace window by changing a position of at least one of said minimum trace offset and said maximum trace offset.

11. The computer program product of claim 8 wherein changing the trace window involves moving the trace window by changing a position of both said minimum trace offset and said maximum trace offset.

12. The computer program product of claim 8 wherein changing the trace window involves changing the trace window to include a particular method which was previously not in the trace window.

13. The computer program product of claim 8 wherein said adaptation rules take into account the amount of data stored in said storage.

14. The computer program product of claim 8 wherein said adaptation rules take into account the amount of data stored in said storage which was generated by methods having an offset lower than a particular value.

15. An apparatus for obtaining trace data with respect to a running software program comprising:
- means for accessing a method in a call stack, said call stack including a sequentially ordered list of methods called during the running of the software program;
- means for determining if the accessed method in the call stack falls between a minimum trace offset and a maximum trace offset where the minimum trace offset and the maximum trace offset define a trace window, obtaining trace data for said method and outputting the trace data to an output stream;
- means for collecting the trace data into a trace data storage; and
- means for determining if the trace data in the trace data storage meets predetermined adaptation rules then changing the position in the call stack of at least one of the minimum trace offset and the maximum trace offset.

* * * * *